(12) United States Patent
Toyoda

(10) Patent No.: US 7,375,893 B2
(45) Date of Patent: May 20, 2008

(54) METHOD OF MANUFACTURING MICROLENS, MICROLENS, OPTICAL FILM, SCREEN FOR PROJECTION, PROJECTOR SYSTEM, ELECTROOPTICAL DEVICE AND ELECTRONIC EQUIPMENT

(75) Inventor: Naoyuki Toyoda, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/382,090

(22) Filed: May 8, 2006

(65) Prior Publication Data

US 2006/0262410 A1    Nov. 23, 2006

(30) Foreign Application Priority Data

May 19, 2005    (JP)    ............... 2005-146466

(51) Int. Cl.
   *G02B 27/10*    (2006.01)
(52) U.S. Cl. ............... 359/619; 359/620; 359/621; 359/623; 359/627
(58) Field of Classification Search ........ 359/619–628, 359/631; 349/110, 112, 95; 347/106, 241, 347/244
   See application file for complete search history.

(56) References Cited

U.S. PATENT DOCUMENTS 6,952,311 B2 * 10/2005 Sakai ............... 359/619

7,145,725 B2    12/2006 Hasei
2005/0270651 A1 * 12/2005 Boettiger et al. ........... 359/618

FOREIGN PATENT DOCUMENTS

| JP | 06-317701 | | 11/1994 |
| JP | 2001-141906 | | 5/2001 |
| JP | 2003-240913 | * | 2/2002 |
| JP | 2003-258380 | | 9/2003 |
| JP | 2004-338274 | | 12/2004 |
| JP | 2004-341315 | | 12/2004 |
| KR | 2005-0016234 | | 8/2004 |

* cited by examiner

*Primary Examiner*—Ricky Mack
*Assistant Examiner*—Brandi N Thomas
(74) *Attorney, Agent, or Firm*—Harness, Dickey & Pierce, P.L.C.

(57) ABSTRACT

A method of manufacturing a microlens having a convex shape on a substrate includes: a step of providing a first droplet on the substrate, a step of forming a first convex portion by drying the first droplet so as to solidify the first droplet, a step of providing a second droplet of a lens material in a concave area that is placed at a center of the first convex portion and a step of forming a second convex portion by curing the second droplet.

14 Claims, 8 Drawing Sheets

METHOD OF MANUFACTURING MICROLENS, MICROLENS, OPTICAL FILM, SCREEN FOR PROJECTION, PROJECTOR SYSTEM, ELECTROOPTICAL DEVICE AND ELECTRONIC EQUIPMENT

BACKGROUND OF THE INVENTION

1. Technical Field

The present invention relates to a method of manufacturing a microlens, a microlens, an optical film, a screen for projection, a projector system, an electrooptical device and electronic equipment.

2. Related Art

Various display devices (electrooptical devices) are equipped with color filters in order to display in color. The color filter consists of a substrate made of, for example, glass and substrate, and filter elements colored with various colors such as red (R), green (G) and blue (B) and fabricated on the substrate in the form of dots. The filter elements are arranged in a certain pattern such as so-called stripe, delta and mosaic arrangement on the substrate.

The electrooptical device including a liquid crystal device and an electroluminescence (EL) device as a display has display dots arranged on a substrate of such as glass and plastic. An optical state in each display dot is independently controllable. In the case of the liquid crystal device and the EL device, liquid crystal or an EL light emitting part is provided in each display dot. The display dots are typically arranged in, for example, a latticed pattern (a dot matrix pattern).

The display dot (the liquid crystal or the EL light emitting part) is formed corresponding to each color, such as R, G and B as described above in a display device so that the device is capable of displaying in color. One pixel consists of a group of the display dots in order to display all the colors. For example, the group comprises three display dots. The color display is performed by controlling a tone of each display dot in the pixel.

As for a liquid crystal device, a microlens is typically provided in a backlight for a liquid crystal display that is embedded in the liquid crystal device, so that light from a light source in the backlight is effectively collected by the liquid crystal elements. JP-A-2005-62507 is a first example of related art. There are many reports including the first example about a method of fabricating the microlens by using a droplet discharge method. In a typical fabrication of a microlens by the droplet discharge method, an aspect ratio and a curvature of the microlens depends on a contact angle of a droplet discharged to form the microlens to the substrate. However, it is difficult to heap up the droplet beyond the contact angle. For this reason, a pinning effect (with which a droplet is retained by a step) utilizing a bank is required in order to improve the aspect ratio.

JP-A-2003-258380 is a second example of related art. As described in the second example, the bank is formed so as to surround a lens formed part by photolithography. JP-A-2001-141906 is a third example of related art. According to the third example, a liquid-repellant patterned film is formed as an alternative to the bank. JP-A-2004-338274 is a forth example of related art and JP-A-2004-341315 is a fifth example of related art. According to the forth and fifth examples, a foundation is formed by the photolithography.

In the manufacturing processes of the structures described in the examples, there are exposure steps and development steps. Masks are used in the exposure steps and developer is used in the development steps. Accordingly, the overall manufacturing process becomes insufficient. In other words, the hitherto known manufacturing methods did not fully utilize the advantages of the droplet discharge method.

SUMMARY

An advantage of the invention is to provide a simple manufacturing method of a microlens, a microlens and a optical film with fine optical characteristics, a screen for projection, a projector system, an electrooptical device and electronic equipment.

According to a first aspect of the invention, a method of manufacturing a microlens having a convex shape on a substrate including a step of providing a first droplet on the substrate, a step of forming a first convex portion by drying the first droplet so as to solidify the first droplet, a step of providing a second droplet of a lens material in a concave area that is placed at a center of the first convex portion and a step of forming a second convex portion by curing the second droplet.

According to the first aspect of the invention, the first convex portion having the concave area at its center is formed because of the so called coffee stain phenomenon when the first droplet is dried so as to be solidified. The microlens can be formed only by the droplet discharge method, if the second droplet of the lens material is provided in the concave area of the convex portion and then dried so as to be cured. Therefore, the manufacturing process becomes efficient because there is no need of an exposure step and a developing step. Furthermore, by utilizing the contact angle of the convex portion, it is possible to increase the amount of the droplet heaping up in the convex portion and to form the microlens with a larger curvature or a high aspect ratio.

In this case, it is preferable that the substrate is made liquid-repellent before the first droplet is provided. This means that the size of the first droplet disposed on the substrate tends to become smaller because the first droplet of the bank material is repelled on the substrate. Accordingly, the first convex portion can be formed smaller and denser. Furthermore, the microlens with the high curvature or aspect ratio can also be formed by disposing the lens material in the form of the second droplet on the first convex portion because the first convex portion is made liquid repellent.

It is also preferable that the first convex portion is made liquid-repellent before the second droplet is provided.

Since the first convex portion is made liquid-repellent, it is possible to increase the curvature or aspect ratio of the microlens if the lens material in the form of the second droplet is provided on the first convex portion.

Furthermore, it is preferable that a peripheral part of the first convex portion is higher than an inner part of the first convex portion when the first convex portion is formed.

In this way, the inner part of the first convex portion is lower than the peripheral part so that the second droplet of the lens material easily stays at the low part of the first convex portion. In addition, the lens material can be easily disposed on the first convex portion because the amount of the droplet heaping up on the portion will increase by utilizing the contact angle of the convex portion area.

In this case, the first droplet is preferably a liquid repellent material when the first convex portion is formed.

In this way, the second droplet will be repelled by the first convex portion made of the liquid repellent material. Therefore, it is possible to increase the amount of the lens material disposed on the first convex portion without overflowing. In addition, it is possible to form the microlens with the large curvature.

According to a second aspect of the invention, a microlens is manufactured by the above-described method, has a convex shape and is formed on a substrate.

According to the second aspect of the invention, it is possible to provide the dense convex microlens with the large curvature or the high aspect ratio and in which the bank diameter is small.

According to a third aspect of the invention, a microlens having a convex shape and formed on a substrate includes a first convex portion formed by providing a first droplet on the substrate, and drying the first droplet so as to solidify the first droplet and a second convex portion formed by providing a second droplet in a concave area that is placed at a center of the first convex portion, and curing the second droplet.

According to the third aspect of the invention, the first convex portion having the concave area at its center is formed because of the so called coffee stain phenomenon when the first droplet is dried so as to be solidified. The microlens with the large curvature can be provided by disposing the second droplet of the lens material in the concave area of the first convex portion and curing the second droplet.

According to a forth aspect of the invention, an optical film includes a substrate made of an optically transparent sheet or an optically transparent film and the above-described microlens formed on the optically transparent sheet or the optically transparent film.

According to the forth aspect of the invention, the microlens having a high diffusibility can be easily formed on the optically transparent sheet or the optically transparent film. Accordingly, it is possible to provide the optical film with a favorable light diffusibility.

According to a fifth aspect of the invention, a screen for projection includes a scattering film scattering a light towards an incident side or an exit side of the light, and/or a diffusion film diffusing the light, wherein the above described optical film is used as at least one of the scattering film or the diffusion film.

According to the fifth aspect of the invention, it is possible to provide the screen for the projection with the high resolution, contrast and brightness since it has the optical film with the fine light diffusibility as the scattering film or/and the diffusion film According to a sixth aspect of the invention, a projector system includes a projector and the above mentioned screen.

According to the sixth aspect of the invention, it is possible to provide the high resolution projector system since it has the above mentioned high resolution screen.

According to a seventh aspect of the invention, a diffusing plate includes a scattering film scattering light, and wherein the above mentioned optical film is used as the scattering film.

According to the seventh aspect of the invention, it is possible to provide the diffusing plate with the favorable light diffusibility because the microlens having the high light diffusibility is formed on the diffusing plate.

According to an eighth aspect of the invention, a back light includes a light guiding plate and a diffusing plate provided in a light exit side with respect to a position of the light guiding plate, wherein the above-mentioned diffusing plate is used as the diffusing plate.

According to the eighth aspect of the invention, it is possible to provide the back light having the favorable light diffusibility since it has the diffusing plate on which the microlens with the high light diffusibility.

According to a ninth aspect of the invention, an electrooptical device includes the above mentioned back light.

In this way, it is possible to provide the electrooptical device with the fine contrast since it is equipped with the back light having the favorable light diffusibility.

According to a tenth aspect of the invention, electronic equipment includes the above mentioned electrooptical device.

According to the tenth aspect of the invention, it is possible to provide the high resolution electronic equipment since it is equipped with the electrooptical device having the fine contrast.

BRIEF DESCRIPTION OF THE DRAWINGS

The invention will be described with reference to the accompanying drawings, wherein like numbers reference like elements.

DESCRIPTION OF THE EMBODIMENTS

Figure 1:
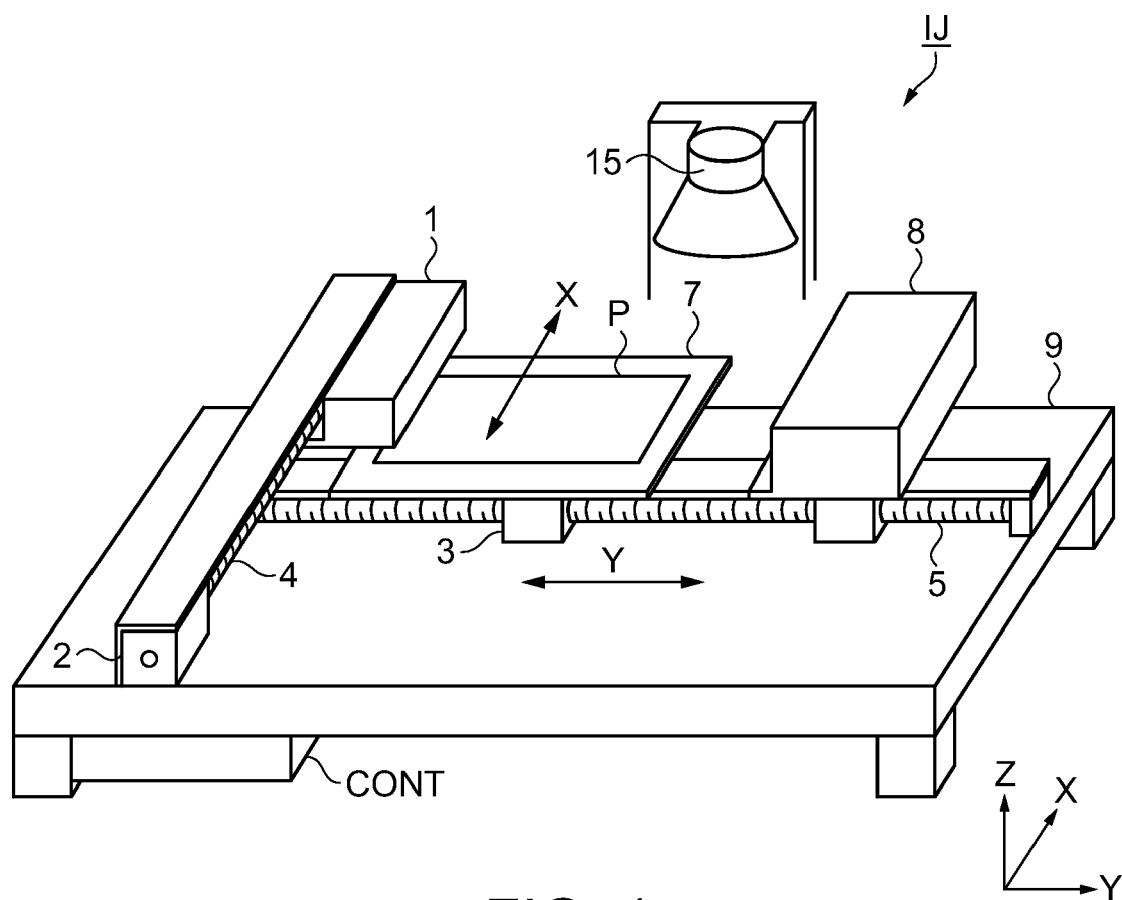
FIG. 1 is a schematic perspective view showing an overall structure of a droplet discharge device.

Embodiments of a microlens and a manufacturing method thereof according to the invention are now described with reference to the accompanying drawings. Here, a substrate on which a functional liquid is applied by a droplet discharge method is taken as an example to describe the invention. Before describing features in structures and methods of the invention, a base substrate used in the droplet discharge method, a method of discharging droplets, a droplet discharge device, a surface treatment method, a bank material and a microlens material are described in order.

Base Substrate

A substrate made of various materials such as a Si wafer, a quartz glass, glass, a plastic film and a metal substrate may be used as the base substrate. Furthermore, a semiconductor film, a metal film, a dielectric film, an organic film and the like may be formed on a surface of the base substrate as a foundation layer.

Method of Discharging Droplets

Discharging techniques of the droplet discharge method include an electrification controlling method, a pressurizing and oscillating method, an electromechanical converting method, an electro-thermal converting method, an electrostatic attracting method, and the like. In the electrification controlling method, an electric charge is given to a material through an electrification electrode and the material is discharged from the nozzle. The discharge direction of the material can be controlled by a deflecting electrode. Moreover, in the pressurizing and oscillating method, a high pressure of about 30 kg/cm$^2$ is applied to a material so as to discharge the material from the tip of the nozzle. When a control voltage is not applied, the material goes straight and is discharged from the nozzle. When the control voltage is applied, due to an electrostatic repulsion generated in the material, the material is dispersed and will not be discharged from the nozzle. In the electrothermal converting method, a piezoelectric element deforms when it receives a pulsed electric signal. The electrothermal converting method utilizes this property and the deformation of the piezo element gives a pressure through a flexible substance to a space storing a material. The material is then pushed out of the space and discharged from the nozzle.

Furthermore, in the electrothermal converting method, the material is rapidly gasified so as to generate bubbles by a heater provided in a space storing the material, so that the material in the space is pushed out and discharged by the pressure of the bubbles. In the electrostatic attracting method, a micro-pressure is applied to a space storing the material and a meniscus of the material is formed in the nozzle, in which state an electrostatic attractive force is applied so as to draw the material out. In addition to these methods, such techniques as using a viscosity variation of a fluid due to an electric field, and blowing the material out by an electric discharge spark, and the like are also applicable. The advantage of the droplet discharge method is that the amount of waste in the used material becomes less, and the desired amount of the material can be surely disposed on a desired position. The amount of one drop of liquid material discharged by the droplet discharge method will be, for example, 1-300 ng.

Droplet Discharge Device

Firstly, an example of a droplet discharge device for discharging a liquid material by the above-mentioned droplet discharge method is described. In this embodiment, the droplet discharge device discharges (drops) a droplet onto a substrate from its droplet discharge head according to the droplet discharge method.

FIG. 1 is a schematic perspective view showing an overall structure of a droplet discharge device IJ.

The droplet discharge device IJ has a droplet discharge head 1, an X-way drive axis 4, a Y-way guide axis 5, a controller CONT, a stage 7, a cleaning mechanical section 8, a table 9 and a heater 15.

The stage 7 surmounts a substrate P to which a liquid material is provided by the droplet discharge device IJ. The stage 7 has an unshown feature to fix the substrate P in a reference position.

The droplet discharge head 1 is a multi-nozzle type head that is equipped with a plurality of discharge nozzles. A Y-axis direction corresponds to a longitudinal direction of the droplet discharge head 1. A discharge nozzle is provided in the plural number on a lower face of the droplet discharge head 1. The nozzles align in the Y-axis direction and are provided with a regular space therebetween. From the nozzle of the droplet discharge head 1, a liquid material is discharged to the substrate P that is held by the stage 7.

An X-way driving motor 2 is coupled to the X-way drive axis 4. The X-way driving motor 2 is a stepping motor and the like, and rotates the X-way drive axis 4 when an X-way driving signal is provided from the controller CONT. When the X-way drive axis 4 is rotated, the droplet discharge head 1 moves in an X-axis direction.

The Y-way guide axis 5 is fixed in such a way that its position will not move against the table 9. The stage 7 has a Y-way driving motor 3. The Y-way driving motor 3 is a stepping motor and the like. When a Y-way driving signal is provided from the controller CONT, the Y-way driving motor 3 moves the stage 7 in the Y-axis direction.

The controller CONT supplies a voltage that controls the discharge of the droplet to the droplet discharge head 1. The controller CONT also supplies a drive pulse signal for controlling an X-axis direction movement of the droplet discharge head 1 to the X-way driving motor 2. The controller CONT also supplies a drive pulse signal for controlling a Y-axis direction movement of the stage 7 to the Y-way driving motor 3.

The cleaning mechanical section 8 cleans the droplet discharge head 1. The cleaning mechanical section 8 has an unshown Y-directional driving motor. The cleaning mechanical section 8 is driven by the driving motor and moves along with the Y-way guide axis 5. This movement of the cleaning mechanical section 8 is also controlled by the controller CONT.

The heater 15 is used to perform a heat treatment of the substrate P by lamp annealing. Solvent contained in the liquid material that is applied to the substrate P will be evaporated and dried with the heater 15. Power on and off of this heater 15 is also controlled by the controller CONT.

The droplet discharge device IJ discharges a droplet to the substrate P as relatively moving the droplet discharge head 1 and the stage 7 that supports the substrate P. The droplet discharge device IJ discharges a droplet through the discharge nozzles that align in the X-axis direction on a lower face of the droplet discharge head 1.

Figure 2:
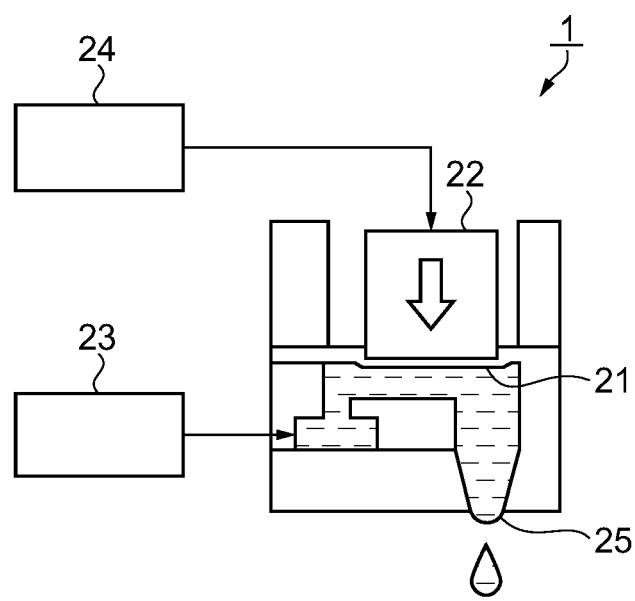
FIG. 2 is a partial perspective view showing a feature of the droplet discharge device.

FIG. 2 is a drawing for explaining a discharging mechanism of a liquid material by a piezo method.

In FIG. 2, a piezo element 22 is provided adjacent to a liquid room 21 which holds a liquid material. The liquid material is supplied to the liquid room 21 through a liquid material supply system 23 including a material tank that stores the liquid material. The piezo element 22 is coupled to a driving circuit 24. Voltage is applied to the piezo element 22 through the driving circuit 24 and the piezo element 22 is deformed. The liquid room 21 is then deformed by the deformation of the piezo element 22 and the liquid material is discharged from a nozzle 25. In this case, a degree of the distortion of the piezo element 22 is controlled by changing a value of the applied voltage. A distortion speed of the piezo element 22 is controlled by changing a frequency of the applied voltage. According to the piezo method, the material will not be heated so that there is an advantage that the composition of the discharged material is hardly affected.

The above-described droplet discharge device can be used in an allocation method and a fabrication method according to the invention. However, any kind of device can be used in the invention in addition to the above-described droplet discharge device provided it can discharge a droplet such that the droplet can land in a predetermined position.

Surface Treatment Method

A surface treatment method in this embodiment includes a method to form an organic thin film on a surface of a substrate, a plasma treatment and the like. The organic thin film is formed on the substrate in order to give a liquid-repellency to the surface of the substrate and in order to control a contact angle of a discharged droplet. Cleaning process is preferably carried out as a pre-treatment process before the liquid-repellency is given to the substrate. For such cleaning process, for example, ultra violet (UV) cleaning, UV/ozone cleaning, plasma cleaning, acid/alkaline cleaning and the like can be adopted.

In the method of forming the organic thin film which imparts the liquid-repellency, an organic thin film made of organic molecules such as silane compounds and surface active agents is formed on a substrate surface where a wiring pattern is going to be formed.

The organic molecules with which the surface of the substrate is treated have a functional group which is capable of physically or chemically being combined with the substrate. The organic molecules also has a functional group which modifies the quality of (i.e., controls the surface energy of) the substrate surface such as a hydrophilic group or hydrophobic group positioned at the opposite side of the substrate-combining functional group. The organic molecules are coupled to the substrate, form the organic thin film and ideally become a monomolecular film. Particularly, an organic molecule with which an organic structure connecting the substrate-combining functional group with the surface quality modifying functional group positioned at the opposite side is a carbon straight chain or a carbon chain partially branched off, will combine with the substrate, be then self assembled, and form a dense self-assembled layer.

The self assembled layer is a film consisting of an oriented compound having combinative functional groups which can react with the constituent atoms of an under-layer of the substrate, and other structures such as straight-chain structures and aromatic ring structures. The compound is highly oriented due to van der Waals interactions between straight-chain structures and π-π stacking amoung the aromatic ring structures. Such self assembled layer is formed of aligning oriented mono-molecules so that it can be made extremely thin, and moreover it can be very uniform at a molecular level. In other words, since the same kind of molecules are positioned in the film surface, it has a very uniform film surface and an excellent liquid repellency or affinity could be given to the film surface.

As such highly oriented compound, for example, a silane compound represented by $R^1SiX^1{}_aX^2{}_{(3-a)}$: wherein $R^1$ is an organic group; $X^1$ and $X^2$ are —$OR^2$, —$R^2$, —Cl; $R^2$ which is contained in $X^1$ and $X^2$ is an alkyl group with the carbon number of 1-4; and m is an integer of 1-3.

The silane compound of the formula $R^1SiX^1{}_aX^2{}_{(3-a)}$ is a compound in which a silane atom is substituted by an organic group and other binding groups in the silane compound are substituted by alkoxy groups, alkyl groups or chlorine groups. The organic group R1 can be a phenyl group, a benzyl group, a phenethyl group, a hydroxyphenyl group, a chlorophenyl group, an aminophenyl group, a naphthyl group, a thianthrenyl group, a pyrenyl group, a thienyl group, a pyrrolyl group, a cyclohexyl group, a cyclohexenyl group, a cyclopentyl group, a cyclopentenyl group, a pyridinyl group, a methyl group, an ethyl group, a n-propyl group, an isopropyl group, a n-butyl group, an isobutyl group, a sec-butyl group, a tert-butyl group, a n-hexyl group, a n-octyl group, a n-decyl group, a n-octadecyl group, a chloromethyl group, a methoxyethyl group, a hydroxyethyl group, an aminoethyl group, a cyano group, a mercaptopropyl group, a vinyl group, an allyl group, an acryloxyethyl group, a metacryloxyethyl group, a glycydoxypropyl group, an acetoxy group or the like.

$X^1$ is an alkoxy group, a chlorine group or a functional group that forms Si—O—Si bond and the like. Accordingly, $X^1$ is hydrolyzed by water and desorbed as an alcohol or acid. As such alkoxy group, a methoxy group, an ethoxy group, an n-propoxy group, an isopropoxy group, n-butoxy group, an n-isobutoxy group, a sec-butoxy group, a tert-butoxy group and the like can be named.

The carbon number of $R^2$ preferably lies within the range of 1-4 because molecular weight of a desorbed alcohol molecule becomes relatively small and it can be easily removed. Moreover, it is possible to prevent the density of the formed film from being lower.

A fluorine-alkylsilane compound where R1 has a perfluoroalkyl structure of $C_nF_{2n+1}$ and n is the integer of 1-18 can be named as the typical water-repellant silane compound of the formula $R^1SiX^{1a}X^2{}_{(3-a)}$. With the fluorine-alkylsilane compound, the self-assembled layer is formed by aligning chemical compounds in such a way that the fluoroalkyl groups position in the surface of the film. In this way, a uniform liquid repellency can be given to the film surface.

Such silane compounds having the fluoroalkyl group or a perfluoroalkylether structure are generally called as "FAS". The chemical compound may be used alone or more than one kind of the chemical compounds combined may be adopted. By using the FAS, it is possible to obtain a firm adhesion with the substrate and a fine liquid repellency.

In addition to the silane compound, a surface active agent represented by $R^1Y^1$ can also be used since it is also highly oriented. $R^1$ denotes a hydrophobic organic group. $Y^1$ denotes a hydrophilic polar group such as —OH, —(CH$_2$CH$_2$O)nH, —COOH, —COOA, —CONH$_2$, —SO$_3$H, —SO$_3$A, —PO$_3$H$_2$, —PO$_3$A, —NO$_2$, —NH$_2$, —NH$_3$B (ammonium salt), ≡NHB (pyridinium salt) and —NX$^1{}_3$B (alkylammonium salt) or the like, where "A" indicates one or more than one positive ion, "B" indicates one or more than one negative ion, and $X^1$ is the alkyl group with the carbon number of 1-4.

The surface active agent of the formula $R^1Y^1$ is amphiphile and a compound in which a hydrophilic functional group is coupled to the lipophilic organic group $R^1$. $Y^1$ denotes a hydrophilic polar group that combines or adsorbs with the substrate. The organic group $R^1$ is lipophilic and aligns at the opposite side to a hydrophilic face so as to form a lipophilic face on the hydrophilic face.

A fluorine-alkyl surface active agent can be named as the typical water-repellant silane compound of the formula $R^1Y^1$. The fluorine-alkyl surface active agent of the formula $R^1Y^1$ has a structure where $R^1$ has a perfluoroalkyl structure of $C_nF_{2n+1}$ with n of the integer of 1-18 or the perfluoroalkylether structure.

These surface active agents having the perfluoroalkyl structure or the perfluoroalkylether structure can be used alone or more than one of them combined thereof can also be used. With the surface active agent having the perfluoroalkyl group, it is possible to obtain firm adhesion with the substrate and a fine liquid repellency.

Moreover, the alkyl structure does not necessarily include fluorine. A typical surface active agent may also be used to obtain the water-repellency by forming a dense film.

The organic film consisting of the organic molecules such as the silane compound, the surface active agent and the like is formed on the substrate P when the above-mentioned material chemical compound and the substrate P are contained in the same sealed container and left for two to three days at room temperature. Alternatively, the organic film can be formed by keeping the whole sealed container at a temperature of 80-100° C. for about 1-3 hours. It should be understood that, although the organic film is formed from a gas phase in the above forming method, such self-assembled film may also be formed from a liquid phase. For example, the self assembled film is formed on the substrate by immersing the substrate in a solution which contains the material chemical compound for about 30 minutes to 6 hours, cleaning the substrate, and then drying it. If the solution containing the material chemical compound is heated to 40-80° C., the self assembled film can be formed by immersing the substrate for 5 minutes to 2 hours.

In a plasma treatment method, the substrate P is irradiated with plasma under atmospheric pressure or vacuum. A type of gas used in the plasma treatment can be appropriately selected in consideration of the surface material of the substrate and the like. For example, tetra-fluoromethane, perfluorohexane, perfluorodecane and the like can be used. Conditions for performing the plasma processing method (a $CF_4$ plasma processing method) using the tetrafluoromethane gas as the process gas are, for example, at a plasma power of 50-1000 W, a flow rate of a carbon tetrafluoride gas of 50-100 ml/min, a relative shifting speed of the substrate with respect to a plasma discharge electrode of 0.5-1020 mm/sec, and a substrate temperature of 70-90° C.

Material for Bank

Material for forming a bank in the embodiment according to the invention is not especially limited as long as it is in a liquid state so that it can be discharged in the course of the forming process and it can be solidified after it was discharged. For example, a solution of a resin which is dissolved in a solvent is adoptable. The solution is applied to form the bank and then the solvent will be removed. In addition to this, as the material of the bank, there are a thermoplastic resin, a thermosetting resin, a photo-curing resin, a resin solution, and particles dispersed in a solution.

Organic material including polyimide, an acrylic resin and novolac-series resin is typically used to form the bank. In addition to these material, oligomers and polymers such as polyvinyl alcohol, unsaturated polyester, methyl-methacryl resin, polyethylene, diallyl phthalate, ethylene-propylene-diene monomer, epoxy resin, phenol resin, polyurethane, melamine resin, polycarbonate, polyvinyl chloride, polyamide, stylene-butadiene rubber, chloroprene rubber, polypropylene, polybutylene, polystylene, polyvinyl acetate, polyester, polybutadiene, polybenzimidazole, polyacrylonitrile, epichlorohydrin, polysulfide, polyisoprene and the like can be adopted to form the bank.

The bank material should nether react with the resin which contacts with the material nor dissolve in a solution. For this reason, it is preferred to use the thermo-setting or photo-curing resins which can be harden after it is discharged.

The photo-curing resin used here typically has at least one functional group which is ionically or radically polymerized with ions or radicals generated by photo irradiation to a photo polymerization initiator. Molecular weight increases with the ion or radical polymerization, and a monomer or an oligomer that forms a cross-linked structure may be further added if necessary. The photo-curing resin is such hardened resin composition including the functional group, the photo polymerization initiator and the monomer or oligomer. Here, the functional group means an atom group or a coupling scheme which reacts with the vinyl group, a carboxy group, the amino group, a hydroxyl function, an epoxy group and the like.

The thermo-setting resin used here typically has at least one functional group which is ionically or radically polymerized with ions or radicals generated by heating a heat polymerization initiator. Molecular weight increases with the ion or radical polymerization, and a monomer or an oligomer that forms a cross-linked structure may be further added if necessary. The thermo-setting resin is such hardened resin composition including the functional group, the photo polymerization initiator and the monomer or the oligomer. Here, the functional group means the atom group or the coupling scheme which reacts with the vinyl group, the carboxy group, the amino group, the hydroxyl function, the epoxy group and the like.

In case of a resin solution such as varnish, a polymer having a adequate heat resistance such as polyimide is dissolved in the solution in advance, and then it is separated out by drying. In this way, the bank can be formed from the resin solution without hardening it by light or heat.

Particle dispersion liquid can also be used to form the bank since a fine heat resistance and optical transparency can be obtained. The particle may be made of silica, alumina, titania, calcium carbonate, aluminum hydroxide, acrylic resin, organic silicone resin, polystyrene, urea resin, formaldehyde condensate and the like, or any combination thereof. In the case of the particle, the bank is made by condensing the particles which are dried and deposited. A surface of the particle may be treated so as to impart photosensitivity or thermosensitivity in order to enhance the adhesiveness between the particle and a particle on a substrate.

In this embodiment, if necessary, a small amount of a surface tension regulator such as fluorinated, silicon-like and nonionic regulator can be added into a droplet of the above-mentioned bank material provided it will not impair a necessary function of the bank. These surface tension regulators improve a wettability of ink when the ink is applied. This helps to improve a leveling property of the applied film and to prevent bubbles from being generated like rash in the film.

The droplet of the bank material prepared in the above-mentioned way preferably has a viscosity of 1-50 mPa·s. This is because when the solution is discharged by the droplet discharge device, if the viscosity is smaller than 1 mPa·s, the area around the nozzle could be easily contaminated by discharged ink. If the viscosity is larger than 50 mPa·s, the frequency of clogging occurring at the nozzle hole increases, making it difficult to smoothly discharge droplets. More preferably, the viscosity lies within the range of 5-20 mPa·s.

Furthermore, the droplet of the prepared bank material preferably has a surface tension of 1-50 mPa·s. This surface tension lies in the range of 0.02-0.07 N/m. This is because when the solution is discharged by the droplet discharge device, if the surface tension is less than 0.02 N/m, the wettability of the droplet with respect to the nozzle surface increases so that the discharge direction tends to be deviated. If the surface tension exceeds 0.07 N/m, the shape of the meniscus at the tip of the nozzle becomes unstable, making it difficult to control the discharge amount and the discharge timing of the droplet.

Material for Microlens

Material for forming a microlens in the embodiment according to the invention is not especially limited provided it is in a liquid state so that it can be discharged in the course of the forming process, it can be solidified after it was discharged, and it has an optical transparency after solidified so that it can serve as a lens. For example, a solution of a resin which is dissolved in a solvent and has the optical transparency is adoptable. The solution is applied to form the microlens and then the solvent will be removed. In addition to this, as the material of the microlens, there are resins such as the thermoplastic resin, the thermosetting resin, and the photo-curing resin. However, the photo-curing resin is preferable because it can be easily and quickly cured and the lens material and a base material will not be heated to high temperature when it is cured.

Such photo-curing resin typically has at least one functional group which is ionically or radically polymerized with ions or radicals generated by photo irradiation to a photo polymerization initiator. Molecular weight increases with the ion or radical polymerization, and a monomer or an oligomer that forms a cross-linked structure may be further added if necessary. The photo-curing resin is such hardened resin composition including the functional group, the photo polymerization initiator and the monomer or oligomer. Here, the functional group means the atom group or the coupling scheme which reacts with the vinyl group, the carboxy group, the hydroxyl function and the like.

Such monomer and oligomer includes an unsaturated polyester type, an enethiole type, an acrylic type and the like. Especially, the acrylic type is preferable in terms of the curing speed and the property variation. Among such acrylic type monomers and oligomers, the monofunctional ones include 2-ethylhexyl acrylate, 2-ethylhexyl EO adduct acrylate, ethoxydiethyleneglycol acrylate, 2-hydroxyethyl acrylate, 2-hydroxypropyl acrylate, caprolactone adduct of 2-hydroxyethyl acrylate, 2-phenoxyethyl acrylate, phenoxydiethyleneglycol acrylate, nonylphenol EO adduct acrylate, acrylate of the addition of caprolactone to the nonylphenol EO adduct, 2-hydroxy-3-phenoxypropyl acrylate, tetrahydrofurfuryl acrylate, caprolactone adduct of furfurylalcohol acrylate, acryloylmorpholine, dicyclopentenyl acrylate, dicyclopentanyl acrylate, dicyclopentenyloxyethyl acrylate, isobornyl acrylate, caprolactone adduct of 4,4-dimethyl-1,3-dioxolan acrylate, caprolactone adduct of 3-methyl-5,5-dimethyl-1,3-dioxolan acrylate and the like.

Such acrylic type polyfunctional monomers and oligomers include hexanediol acrylate, neopentyl glycol diacrylate, polyethylene glycol diacrylate, tripropylene glycol diacrylate, hydroxypivalate neopentyl glycolester diacrylate, caprolactone adduct of hydroxypivalate neopentyl glycolester diacrylate, acrylate adduct of diglycidylether of 1,6-hexanediol, diacrylate of acetal compound of hydroxypivalaldehyde and trimethylolpropane, 2,2-bis[4-(acryloyloxydiethoxy) phenyl]propane, 2,2-bis[4-(acryloyloxydiethoxy) phenyl]methane, diacrylate of hydrogenated bisphenol ethyleneoxide adduct, tricyclodecane dimethanol diacrylate, trimethylolpropane triacrylate, pentaerythritol triacrylate, trimethylolpropane propyleneoxide adduct triacrylate, glycerin propyleneoxide adduct triacrylate, dipentaerythritol hexa-acrylate penta-acrylate mixture, acrylate of caprolactone adduct of dipentaerythritol, tris (acryloyloxyethyl) isocyanurate, 2-acryloyloxyethyl phosphate and the like.

Light diffusive particles may be mixed and dispersed in the above-mentioned transparent resins. As for the light diffusive particles, particles made of silica, alumina, titania, calcium carbonate, aluminum hydroxide, acrylic resin, organic silicone resin, polystyrene, urea resin and formaldehyde condensate can be used. The particles may consist of either only one kind of the above-mentioned material or combination thereof. In case that the particle has the optical transparency, refraction factor of the particle must be sufficiently different from that of the above-described light transmissive resin in order to make full use of light diffusibility of the light diffusive particle. The material for the transparent light diffusive particle will be selected depending on the adopted transparent resin so as to satisfy the above-mentioned refraction factor condition.

Such light diffusive particles are dispersed in the transparent resin in advance so that the liquid of the resin and the particles can be discharged from the droplet discharge head. It is preferable that the surfaces of the light diffusive particles are coated with surfactants or a fused resin in order to enhance the dispersibility of the light diffusive particles in the optically transparent resin. The surfactant used for the coating will be selected from a cation-based resin, an anion-based resin, an nonion-based resin, an amphoteric resin, a silicon-based resin, a fluoric-based resin and the like depending on the type of the light diffusive particle.

The diameter of the light diffusive particle is preferably above 5 nm and below 1000 nm, more preferably, 200-500 nm. When it is larger than 200 nm, a fine light diffusiveness can be obtained. When it is smaller than 500 nm, it can be securely discharged from a nozzle of the droplet discharge head.

In this way, a microlens 30 is made of the optical transparent resin in which the light diffusive particles are mixed and dispersed. Therefore, a higher light diffusiveness can be given to the microlens because it is compounded with the light diffusive particles. Furthermore, it is possible to decrease the thermo-plasticity of the microlens so that a fine heat resistance can be obtained.

Resins containing an inorganic compound can also be adopted to form the microlens in order to obtain the heat resistance and a fine optical transparency. To be more specific, silicon, germanium, titanium and the like can be used. However, the resin containing the silicon is preferable because it is easily obtainable.

As polymers which can form the microlens, there are polysiloxane, polysilane, polysilazane and the like. These compounds contain silicon in their polymeric main chain skeleton and form silicon oxide that is similar to glass by a chemical reaction caused by heat, light, catalyst or the like. Since the silicon oxide formed in such way has a better heat resistance and optical transparency compared to that of the resin only made of organic materials, such polymers are appropriate for forming the microlens.

More specifically, such silicon oxide can be obtained by discharging a solution of polysiloxane having an alkoxy group and solvent, drying the discharged solution, and heating so as to condense the alkoxy group. The silicon oxide can also be obtained by discharging a polysilane solution, irradiating the discharged solution with ultraviolet so as to photo-oxidize the polysilane. The silicon oxide can also be obtained by discharging a polysilazane solution, hydrolyzing the polysilazane with ultraviolet, acid, alkali or the like, and oxidizing it.

In this embodiment, if necessary, a small amount of a surface tension regulator such as fluorinated, silicon-like and nonionic regulator can be added into a droplet of the above-mentioned bank material provided it will not impair a necessary function of the bank. These surface tension regulators improve a wettability of ink when the ink is applied. This helps to improve a leveling property of the applied film and to prevent bubbles from being generated like rash in the film.

The droplet of the bank material prepared in the above-mentioned way preferably has a viscosity of 1-50 mPa·s. This is because when the solution is discharged by the droplet discharge device, if the viscosity is smaller than 1 mPa·s, the area around the nozzle could be easily contaminated by discharged ink. If the viscosity is larger than 50 mPa·s, the frequency of clogging occurring at the nozzle hole increases, making it difficult to smoothly discharge droplets. More preferably, the viscosity lies within the range of 5-20 mPa·s.

Furthermore, the droplet of the prepared bank material preferably has a viscosity of 1-50 mPa·s. This surface tension lies in the range of 0.02-0.07 N/m. This is because when the solution is discharged by the droplet discharge device, if the surface tension is less than 0.02 N/m, the wettability of the droplet with respect to the nozzle surface increases so that the discharge direction tends to be deviated. If the surface tension exceeds 0.07 N/m, the shape of the meniscus at the tip of the nozzle becomes unstable, making it difficult to control the discharge amount and the discharge timing of the droplet.

Manufacturing Method of Microlens

In the embodiment according to the invention, a bank material or a droplet containing the bank material is discharged through the droplet discharge head in a droplet form so as to be provided on a substrate according to the droplet discharge method. A surface of the substrate will be treated in advance. The discharged droplet is then dried so as to form a specific shape and then the bank is formed. Furthermore, the microlens material or a droplet containing the microlens material is discharged through the droplet discharge head in a droplet form so as to be provided on the bank. A shape of the lens is controlled with the bank according to the fabrication method of the microlens hereinafter described.

Figure 3A:
FIGS. 3A through 3G are sectional views showing steps of a manufacturing process of a microlens.
Figure 3B:
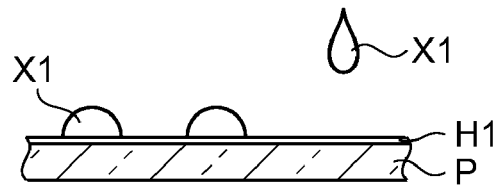
Figure 3C:
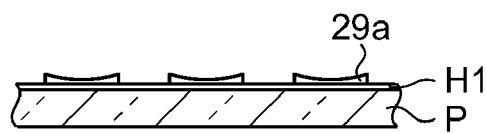
Figure 3D:
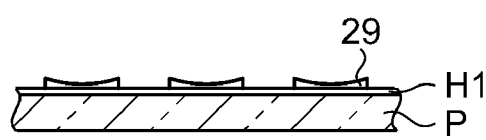
Figure 3E:
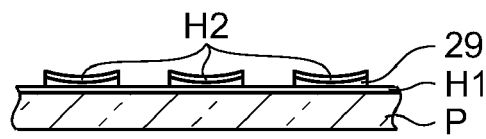
Figure 3F:
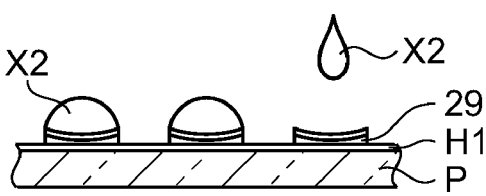
Figure 3G:
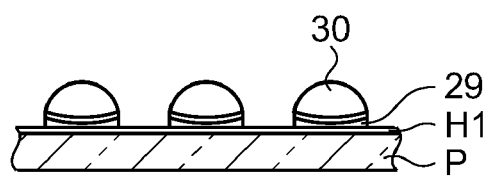
Figure 4:
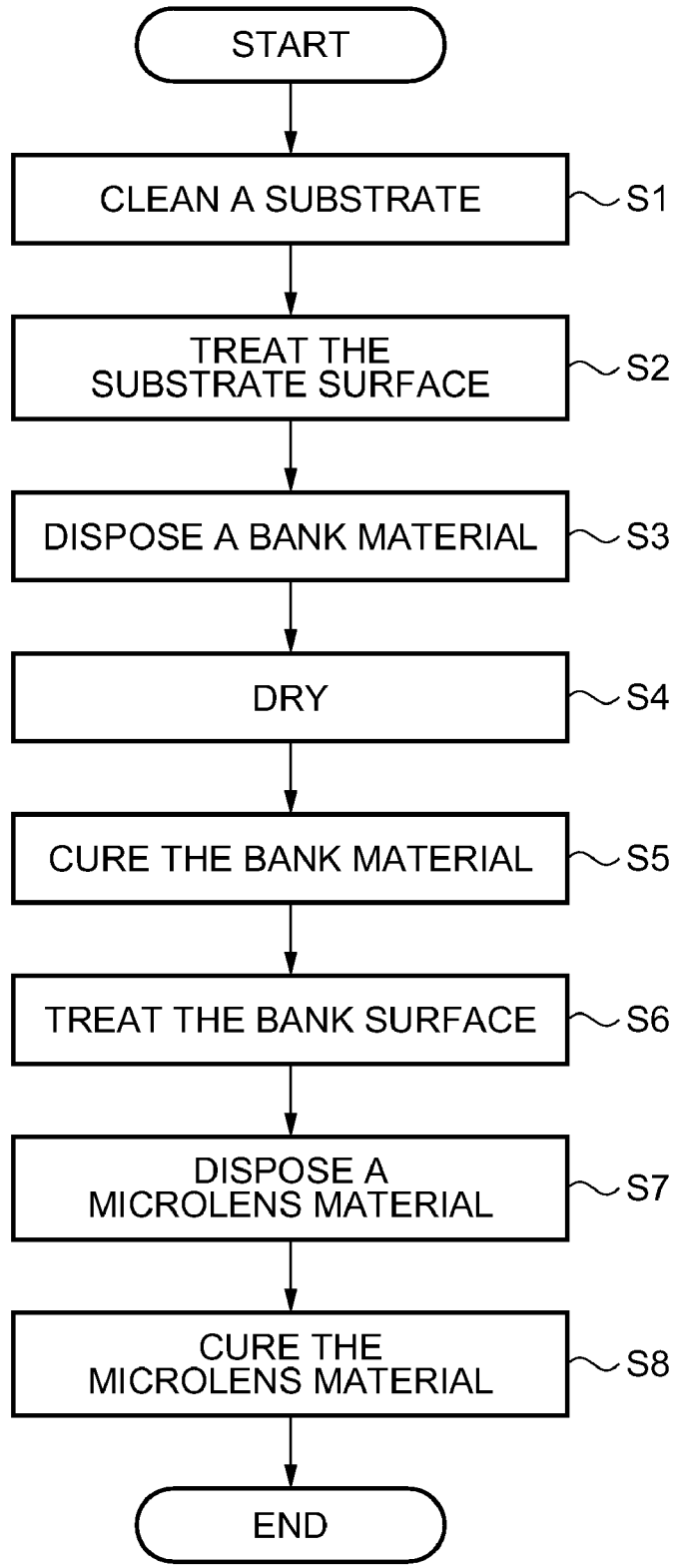
FIG. 4 is a flow chart schematically showing sequence of the manufacturing process of the microlens.

FIGS. 3A through 3G are sectional views showing steps of a manufacturing process of the microlens, and FIG. 4 is a flow chart schematically showing sequence of the manufacturing process of the microlens.

The method of manufacturing a microlens according to the invention will be now described with reference to FIG. 3 and FIG. 4. The method of manufacturing a microlens in this embodiment includes a substrate cleaning step, a substrate surface treatment step, a bank material disposing step, a drying step, a thermal/photo treatment step, a bank surface treatment step, a microlens material disposing step and a microlens material curing step. Each step is hereinafter described in detail.

Substrate Cleaning Step

The substrate P is cleaned in Step S1 in FIG. 4. This cleaning is preferably performed as a pretreatment before a liquid repellant process in order to adequately carry out the liquid repellant process of the substrate P. The ways to clean the substrate P will be, for example, ultraviolet cleaning, ultraviolet/ozone cleaning, plasma cleaning, acid or alkali cleaning and the like. The substrate P here is made of glass.

Substrate Surface Treatment Step

As shown in FIG. 3A, the surface of the substrate P is treated in Step S2 in FIG. 4. This surface treatment of the substrate P is to impart a liquid-repellency to the surface of the substrate P so as to obtain an aimed contact angle. This treatment is performed in order to make a landing diameter of the bank material droplet smaller. The landing diameter is a size of the droplet when it lands on the substrate and corresponds to the diameter of the lens. In the substrate surface treatment step, the surface of the substrate P is treated so as to repel a functional liquid X1 which is the bank material. As the method of imparting the liquid-repellency to the surface of the substrate P, to form an organic thin film on the surface of the substrate P, a plasma treatment and the like can be adopted. Here, the organic thin film was formed and a liquid-repellant layer H1 is then made liquid repellant.

Bank Material Disposing Step

As shown in FIG. 3B, the functional liquid X1, which is the bank material, is discharged on the substrate P by a droplet discharge device IJ and disposed at a predetermined position of the substrate P in Step S3 in FIG. 4. Here, a solution of the photo-curing resin is used as the bank material and a photoresist solution OFRP (product of Tokyo Ohka Kogyo Co., Ltd.) is discharged. Conditions of the droplet discharge will be, for example, a droplet weight of 4 ng/dot and a droplet (discharge) speed of 5-7 mm/sec. Atmosphere in which the droplet is discharged is preferably set to have a temperature of less than 60° C. and a humidity of less than 80%. In this way, a discharge nozzle of a droplet discharge head 1 will not be clogged and the droplet will be stably discharged form it. The thermo-setting resin can also be adopted as the bank material other than the photo-curing resin. The resin can be either polymer or monomer. If the monomer is provided in a liquid form, the monomer itself can be discharged as ink instead of the solution of the monomer. Polymer solution that is insensible to light and heat may also be adopted.

Since the liquid-repellant layer H1 is made water repellant, a part of the discharged functional liquid X1 is repelled by the liquid-repellant layer H1 and a bank diameter tends to become smaller. If the bank diameter is small, a bank 29 can be formed in a high density.

Drying Step

As shown in FIG. 3C, the functional liquid X1 which is the bank material disposed on the substrate P is dried in Step S4 shown in FIG. 4. After the functional liquid X1 is discharged as the bank material, a dispersion medium is removed and then the drying process is carried out. Consequently, the functional liquid is stained up and remains in a specific shape as the bank 29. The specific shape of the stain includes a dent placed at the center of a first convex potion, a circular form and the like. This phenomenon is also called as "coffee stain" which is the phenomenon that solid contents of the droplet aggregate in the peripheral part because of an inner convective flow, and reported in a first document (R. D. Deegam, et al.; Nature, 398, 827; 1977). According to a second document (R. D. Deegam, et al.; Langmuir, 20, 7789; 2004), the faster the drying speed of the liquid and the lower the viscosity of the liquid, more frequently this stain having the specific shape tends to be formed. Accordingly, this specific shape tends to be generated when a solvent with a low boiling point and a low viscosity is used. It is preferable that the drying is performed under the condition of heat or a reduced pressure in which the specific shape is formed in order to increase the drying speed. In this way, a bank material film 29a is formed.

The heating process can be carried out with an ordinary heated plate for heating the substrate or an electric furnace. The heating process can also be carried out by lamp annealing. A light source used in the lamp annealing is not especially limited. For example, an infrared lamp, a xenon lamp, a yttrium, aluminum, garnet (YAG) laser, an argon laser, a carbon dioxide gas laser, excimer lasers of XeF, XeCl, XeBr, KrF, KrCl, ArF, ArCl and the like can be used as the light source. Though such light source typically has a power of 10-5000 W, the power of 100-1000 W is enough for the embodiment.

The decompression can be made by using a rotary pump, a vacuum pump, a turbo pump and the like. The drying may be formed in a ordinary decompression drier equipped with such pump, and the heating process may be combined. This decompression drying process is performed under the reduced pressure of $10^1$-$10^4$ Pa, which is a relatively low vacuum, because the solvent will be boiled too quickly when the vacuum degree is high and it is difficult to obtained a desired shape.

The peripheral part of the bank material is risen like a bank and the inner periphery is dented after this drying step is carried out. The shape of the bank material was observed with an atomic force microscope (AFM), and found out that the peripheral part rises about 5 μm higher than the surface of the glass substrate.

Thermal/Photo Treatment Step

As shown in FIG. 3D, the dried bank material is cured in Step S5 in FIG. 4. The bank material film 29a treated in the dry step should be cured in order to prevent the material from being mixed with a microlens which is going be discharged after this process, and in order to enhance a mechanical and thermal strength of the bank. In the case of the resin solution, the solvent should be completely removed in this step for the same reason. For this reason, a thermal or photo treatment is performed to the substrate P after the discharge step. Consequently, the bank 29 which is a first convex portion is formed.

The thermal or photo treatment is usually performed in the atmosphere. However, the treatment may be carried out in an inactive gas such as nitrogen, argon, helium and the like. Conditions of the thermal or photo treatment are adequately decided depending on the boiling point of the solvent (vapor pressure), a pressure and a type of an ambient gas, a reaction temperature or a reaction light exposure of the polymerization initiator, a reaction temperature or a reaction light exposure of the cross-linking bond, a glass-transition temperature of the oligomer and the polymer, the temperature limit of the substrate, thermal behavior of the particles such as the dispersibility and the degree of oxidation, and the like.

In the photo treatment, the ultraviolet ray, a far-ultraviolet ray, an electron ray, an X-ray and the like can be used to cure and form the bank. The intensity of the radiation is preferably smaller than 1 J/cm$^2$, more preferably, 0.2 J/cm$^2$ in order to improve productivity. The thermal treatment can be performed by the lamp annealing in addition to a hotplate, an electric furnace and the like. The thermal treatment is preferably performed at the temperature of less than 200° C. in case that the temperature is cooler than the glass-transition temperature of the cured resin.

Bank Surface Treatment Step

As shown in FIG. 3E, the bank surface of the cured bank material is treated in Step S6 shown in FIG. 4. The bank surface treatment step is carried out in order to form a convex shape of the microlens and to make the bank surface liquid repellant so as to obtain a required aspect ratio.

More specifically, the bank surface can be made liquid repellant in the same way as the surface of the substrate P is treated. For example, forming an organic thin film, the plasma treatment and the like can be adopted. As described above in the step of imparting liquid repellency to the substrate P, the cleaning process is preferably performed as the pre-treatment process in order to adequately carry out the liquid repellency imparting step. For example, the ultraviolet cleaning, the ultraviolet/ozone cleaning, the plasma cleaning, the acid or alkali cleaning and the like can be adopted. If the bank material inherently having the liquid repellency is used as the droplet, this liquid repellency imparting step may be omitted.

To be more specific, the glass substrate on which the dried bank material having the specific shape is treated under the conditions of a plasma power of 700 W, a flow rate of an oxygen gas of 50 ml/min, a relative shifting speed of the substrate with respect to the plasma discharge electrode of 1 mm/sec, and a substrate temperature of 30° C. By this treatment, organic impurities on the substrate surface are removed and the surface is activated by forming the hydroxyl groups (—OH). The substrate is successively treated under the conditions of the plasma power of 700 W, the flow rate of the carbon tetrafluoride gas of 70 ml/min, the relative shifting speed of the substrate with respect to the plasma discharge electrode of 100 mm/sec, and the substrate temperature of 30° C. As a result, a measured static contact angle of the bank material surface in a case of water was about 100°. In this way, the liquid repellency is given to a liquid-repellant layer H2.

Microlens Material Disposing Step

As shown in FIG. 3F, the microlens material is discharged by the droplet discharge device IJ and disposed onto the bank 29 which is the first convex potion of which surface is treated in Step S7 shown in FIG. 4.

Here, the photo-curing resin solution is used as the bank material so that a functional liquid X2 made of a monomer solution is discharged. The conditions of the droplet discharge are, for example, the droplet weight of 4 ng/dot and the droplet (discharge) speed of 5-7 mm/sec. The atmosphere in which the droplet is discharged is preferably set to have the temperature of less than 60° C. and the humidity of less than 80%. In this way, the discharge nozzle of the droplet discharge head 1 will not be clogged and the droplet will be stably discharged form it. The thermo-setting resin can also be adopted as the bank material other than the photo-curing resin. The resin can be either polymer or monomer. If the monomer is provided in a liquid form, the monomer itself can be discharged as ink instead of the solution of the monomer. Polymer solution that is insensible to light and heat may also be adopted.

Since the liquid-repellant layer H2 is made water repellant, a part of the discharged functional liquid X2 is repelled by the liquid-repellant layer H2 and the adhesiveness between the bank 29 and the microlens 30 becomes less. On the other hand, it is possible to increase the amount of the droplet which is not overflowed and held on the bank 29. Consequently, it is possible to increase the curvature or the aspect ratio (horizontal to vertical ratio) of the microlens 30.

Microlens Material Curing Step

As shown in FIG. 3G, the lens material is processed to be cured in Step S8 shown in FIG. 4.

The microlens material after the microlens material disposing step should be cured in order to enhance a mechanical and thermal strength of the lens. Therefore, a thermal or photo treatment is performed to the substrate P after the discharge step. Consequently, the microlens 30 is formed.

The thermal or photo treatment is usually performed in the atmosphere. However, the treatment may be carried out in the inactive gas such as nitrogen, argon, helium and the like. Conditions of the thermal or photo treatment are adequately decided depending on the boiling point of the solvent (vapor pressure), a pressure and a type of an ambient gas, a reaction temperature or a reaction light exposure of the polymerization initiator, a reaction temperature or a reaction light exposure of the cross-linking bond, a glass-transition temperature of the oligomer and the polymer, the temperature limit of the substrate, thermal behavior of the particles such as the dispersibility and the degree of oxidation, and the like.

In the photo treatment, the ultraviolet ray, a far-ultraviolet ray, an electron ray, an X-ray and the like can be used to cure and form the bank. The intensity of the radiation is preferably smaller than 1 J/cm$^2$, more preferably, 0.2 J/cm$^2$ in order to improve productivity. The thermal treatment can be performed by the lamp annealing in addition to a hotplate, an electric furnace and the like. The thermal treatment is preferably performed at the temperature of less than 200° C. in case that the temperature is cooler than the glass-transition temperature of the cured resin. If the substrate is heated to a higher temperature than the glass-transition temperature, the lens could be deformed to have a small curvature because of it runs by heat.

Figure 5:
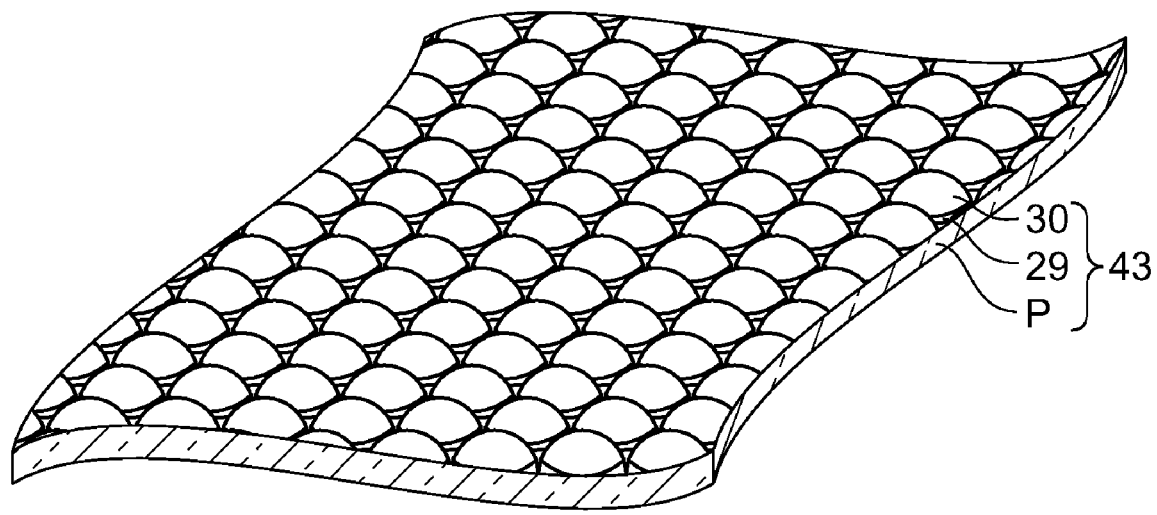
FIG. 5 is a drawing showing an example of a diffusing substrate.

Next, a diffusing plate 43 to which the above-described microlens 30 is adoptable is described. FIG. 5 shows the diffusing plate 43 according to the invention. In the diffusing plate 43, the bank 29 as the first convex portion is formed on the substrate P. The microlens 30 is further formed on the top of the bank 29. The substrate P is made of glass and the microlens is made of the photo-curing resin.

Figure 6:
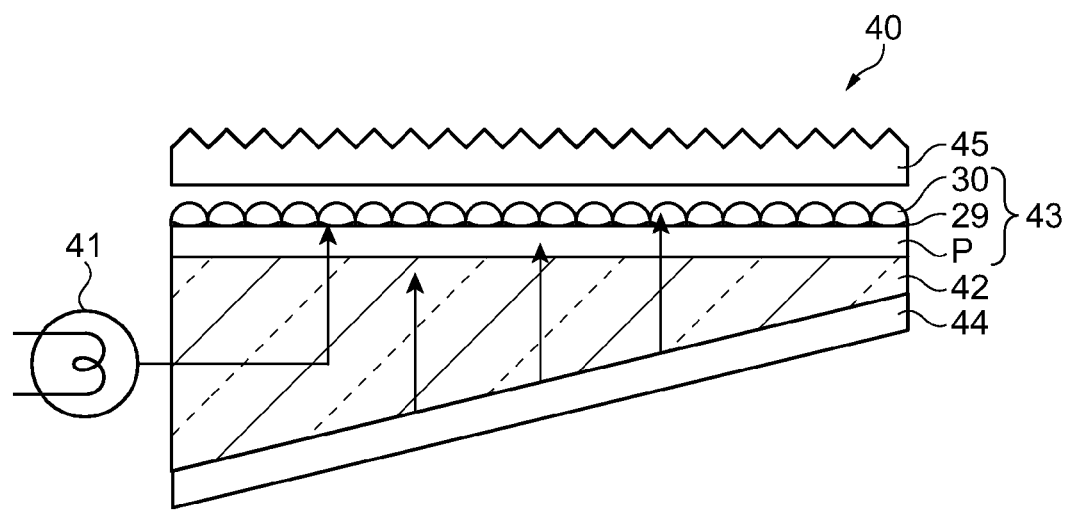
FIG. 6 is a drawing showing an example of a backlight.

Next, a back light 40 equipped with the diffusing plate 43 having the microlens 30 is now described. FIG. 6 shows the back light 40. The back light 40 has a light source 40, a light guiding plate 42, the diffusing plate 43, a reflecting plate 44, a prism sheet 45 and the like. When a light from the light source 41 enters the light guiding plate 42, the entered light passes through the light guiding plate 42 and then enters through the diffusing plate 43. The light is diffused at the diffusing plate 43, passes through the prism sheet 45, and then reaches to a liquid crystal panel 110 (see FIG. 7). A part of the light which is not directed to the prism sheet 45 is reflected by the reflecting plate 44 and then enters into the light guiding plate 42. The microlens 30 is formed on the bank 29 which is the first convex portion on the diffusing plate 43 so that the light from the light guiding plate 42 is sufficiently diffused at the diffusing plate 43. According to the embodiment, the degree of the light diffusion becomes large because the curvature of the microlens 30 is large. The diffused light by the diffusing plate 43 is arranged so as to vertically enter a pixel of the liquid crystal panel 110 (see FIG. 7) after it passes through the prism sheet 45.

Figure 7:
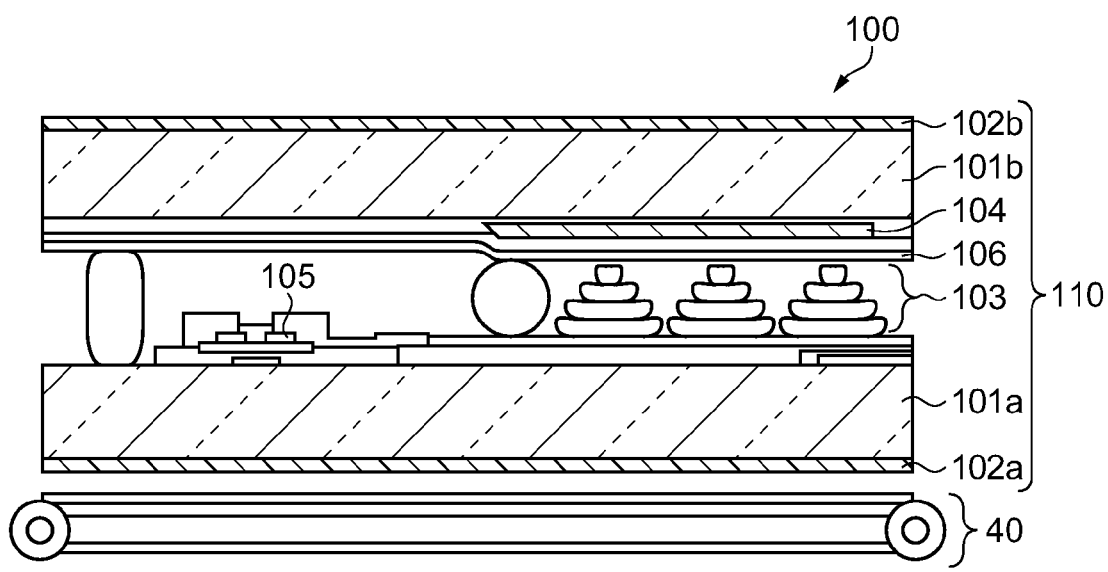
FIG. 7 is a drawing showing a specific example of a liquid crystal device.

Next, a liquid crystal device 100, which is an example of the electrooptical device equipped with the back light 40 having the diffusing plate 43 according to the invention, will be now described. FIG. 7 shows the liquid crystal device 100. The liquid crystal device 100 has the back light 40, the liquid crystal panel 110, a driver LSI (not shown in the figure) and the like. The liquid crystal panel 110 includes a pair of glass substrates 101a, 101b, a pair of polarizing plates 102a, 102b, liquid crystal 103, a color filter 104, a thin film transistor (TFT) 105, an alignment film 106 and the like. The polarizing plates 102a, 102b are adhered on the outer faces of the glass substrates 101a, 101b. The TFT 105 and the like are formed on the inner face of the glass substrate 101a. The color filter 104, the alignment film 106 and the like are formed on the inner face of the glass substrate 101b. The liquid crystal 103 is disposed between the glass substrate 101a and the glass substrate 101b.

The glass substrates 101a, 101b are transparent substrates forming the liquid crystal panel 110. The polarizing plates 102a, 102b can transmit or absorb a specific polarization component. A property of the liquid crystal 103 can be adjusted by mixing a few kinds of nematic liquid crystal. The color filter 104 is a resin film containing colorant or pigment having three primary colors of red (R), green (G) and blue (B). The alignment film 106 is an organic thin film for aligning the liquid crystal 103 and typically made of a polyimide thin film.

The light emitted from the back light 40 passes through the polarizing plate 102a and the glass substrate 101a, and then enters through the liquid crystal 103, the alignment film 106 and the color filter 104 in order. In this way, a certain image or vision can be displayed on the liquid crystal panel 110. Since the back light 40 has the diffusing plate 43 equipped with the microlens 30, the liquid crystal device 100 can provide a high resolution image or vision with a high brightness.

Next, an example of an optical film 31 to which the microlens 30 obtained by the above-described manufacturing is adopted will be described.

Figure 8A:
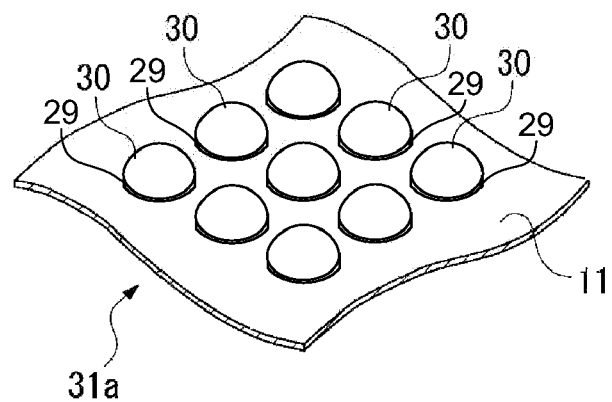
FIGS. 8A and 8B are schematic perspective views showing an example of an optical film.
Figure 8B:
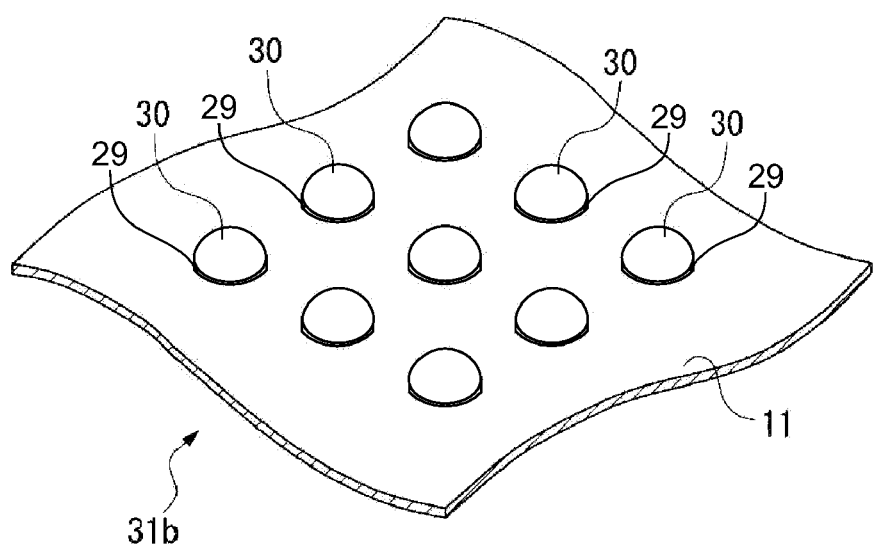

FIGS. 8A and 8B are schematic perspective views showing examples of the optical film 31. A substrate 11 is made of an optically transparent sheet or a transparent film as described before. The microlens 30 is provided in a plural number on the substrate 11 and vertically and horizontally arranged as shown in FIGS. 8A and 8B. This is the structure of an optical film 31a and an optical film 31b according to the invention.

The optical film 31a shown in FIG. 8A is used as a lenticular sheet for a screen whose detail is hereinafter described. The microlenses 30 are closely arranged in the length and breadth of the optical film 31a, in other words, the microlenses 30 are arranged in such a way that a distance between the two adjacent microlenses 30, 30 is relatively smaller than the diameter (an outer diameter at the bottom) of the microlens 30. On the other hand, the optical film 31b shown in FIG. 8B is used as a scattering film for the screen whose detail is hereinafter described. The microlenses 30 are relatively scarcely arranged on the optical film 31b compared with the optical film 31a, in other words, the microlenses 30 are arranged in such a way that the number of the microlens per unit aria is relatively smaller than that of the optical film 31a. The microlens 30 is formed on the bank 29 which is the first convex portion.

The above-described microlenses 30 which have fine diffusion effects and are manufactured at reduced cost are formed on the optical films 31a, 31b. Accordingly, these optical films can be manufactured less costly and can exert the fine light diffusion performance.

The optical film 31a shown in FIG. 8A has the microlense 30 densely arranged in the length and the breadth so that it can acquire a fine light diffusibility and can be adopted as the favorable lenticular sheet for a screen.

The optical film 31b shown in FIG. 8B has the microlense 30 scarcely arranged in the length and the breadth. Therefore, if the optical film 31b is used as the scattering film which scatters the reflected light which once entered the screen, the film will not excessively scatter the incident light entered from a projection side but will favorably scatter the reflected light. In addition, the film has the bank 29 which is the first convex portion, providing the pinning effect with which a droplet is retained by the edge of the bank 29. The aspect ratio (horizontal to vertical ratio) of the microlens 30 can be increased by the pinning effect so that the microlens 30 with a fine lens property is formed on the optical films 31a, 31b.

Figure 9:
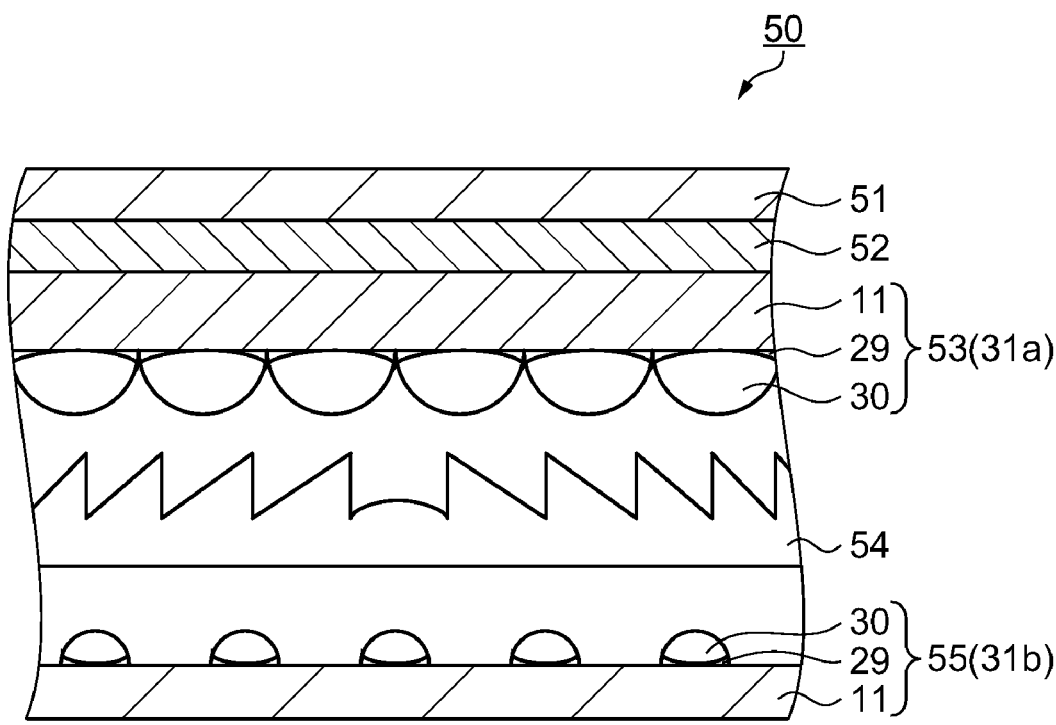
FIG. 9 is a schematic sectional view showing an example of a screen for projection.

FIG. 9 shows an example of a projection screen 50 equipped with the optical films 31a, 31b. The projection screen 50 includes a film substrate 51, a lenticular sheet 53 adhered on the substrate through a adhesion layer 52, a fresnel lens 54 and a scattering film 55 sequentially disposed on the lenticular sheet.

The lenticular sheet 53 is made of the optical film 31a shown in FIG. 8A which is the light transmissive sheet (the substrate 11) on which the plurality of the microlenses 30 is closely arranged. The scattering film 55 is made of the optical film 31b shown in FIG. 8B which is the light transmissive sheet (the substrate 11) on which the plurality of the microlenses 30 is scarcely arranged compared to the lenticular sheet 53.

Since the screen 50 for projection uses the optical film 31a as the lenticular sheet 53 and the optical film 31b as the scattering film 55, the screen can be manufactured at reduced cost compared with the one using a cylindrical lens as the lenticular sheet. Furthermore, quality of the image projected on the projection screen 50 can be improved since the optical film 31a which serves as the lenticular sheet 53 has the fine diffusibility. Moreover, visibility of the image projected on the projection screen 50 can be improved since the optical film 31b which serves as the scattering film 55 has the fine diffusibility. The scattering film essentially has to transmit the projection light from the projector. According to the embodiment of the invention, this projection light from the projector can be sufficiently transmitted because the scattering film 55 has a less number of the convex microlenses 30 compared with the lenticular sheet.

The screen according to the invention shall not be limited to the example shown in FIG. 9. For example, only the optical film 31a may be applied to the lenticular sheet 53, or only the optical film 31b may be applied to the scattering film 55.

Even with such screen, it can be manufactured at reduced cost since it adapts the optical film 31a as the lenticular sheet 53, and it is possible to improve the quality of the image projected on the screen since the optical film serving as the lenticular sheet has the fine diffusibility. Alternatively, the screen using the optical film 31b as the scattering film 55 can be manufactured at reduced cost. Since the optical film 31b serving as he scattering film 55 has the fine diffusibility, when the light transmitted through the scattering film 55 made of the optical film 31b is reflected and reenters (is reflected to) the scattering film 55, it is possible to prevent a specular reflection of the incident light (reflected light) from occurring by diffusing the incident light (reflected light) with the scattering film 55. Accordingly, it is possible to improve the visibility of the image projected on the screen.

Figure 10:
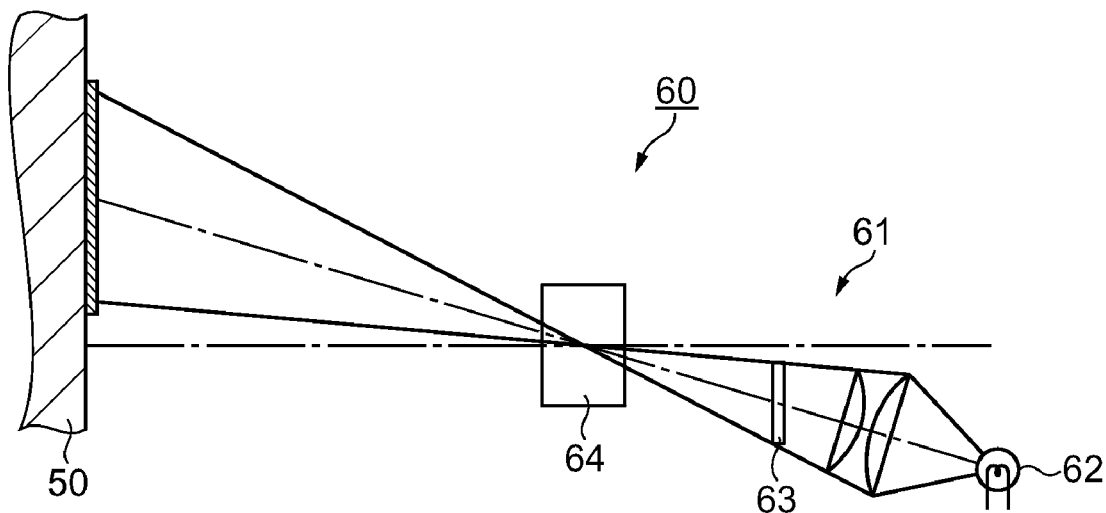
FIG. 10 is a schematic configuration diagram showing an example of a projector system.

FIG. 10 shows an example of a projection system 50 equipped with the projection screen 50 shown in FIG. 9. The projector 60 consists of a projector 61 and the above-described screen for projection. The projector 61 has a light source 62, a liquid crystal light valve 63 disposed on a light axis of light emitted from the light source 62 and modulating light from the light source, an imaging optical system imaging the light modulated by the light modulating device, and an imaging lens (an imaging optical system) producing an image of the light transmitted through the liquid crystal light valve 63.

The liquid crystal light valve may be replaced by an alternative light modulation means such as a means of modulating the light from the light source by driving (controlling a reflective angle of) a micro-reflective member.

Since the projector system 60 has the projection screen 50 shown in FIG. 9, it is possible to improve the visibility and the quality of the image projected on the projection screen 50. Furthermore, it is possible to secure the favorable optical transparency for the light from the projector 61 because of the scattering film 50 made of the optical film 31b.

The projector system 60 may use other screen than the projection screen 50 shown in FIG. 9. Only the optical film 31a may be applied to the lenticular sheet 53, or only the optical film 31b may be applied to the scattering film 55 as described above.

Figure 11:
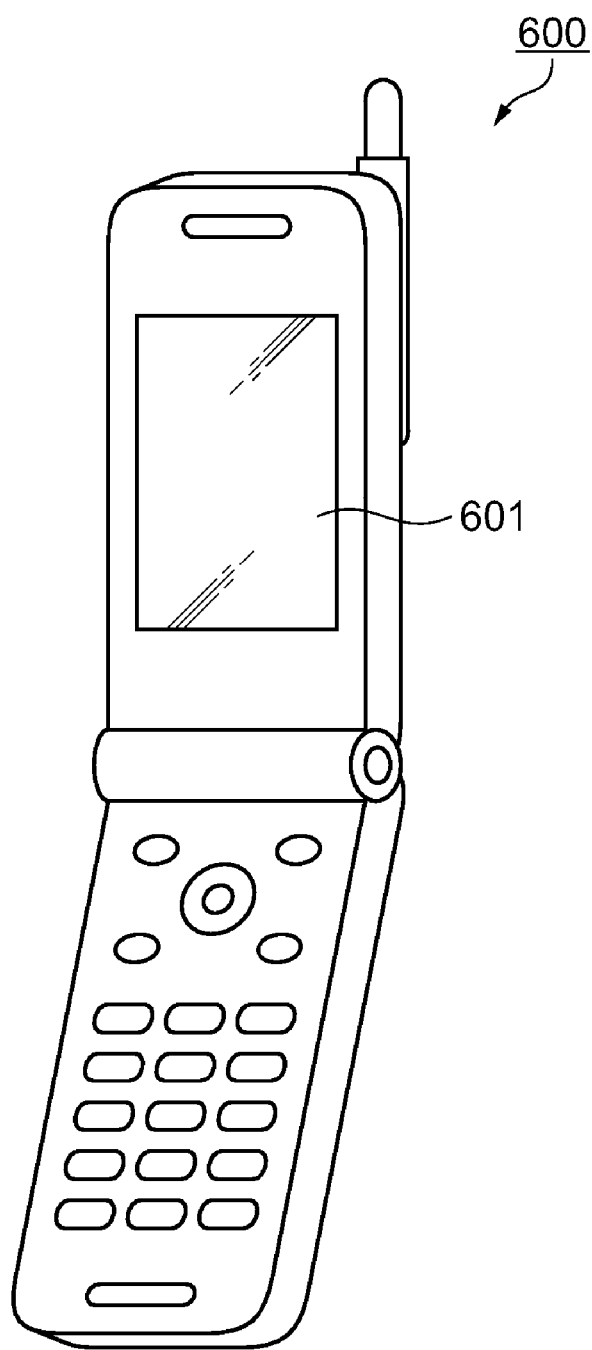
FIG. 11 is a drawing showing a cellular phone as an example of electronic equipment.

FIG. 11 shows a cellular phone 600 as an example of electronic equipment having the liquid crystal device 100 shown in FIG. 7 as the electrooptical device according to the invention. The cellular phone 600 and a liquid crystal display part 601 having the liquid crystal device 100 are shown in FIG. 11. Because the cellular phone 600 is equipped with the liquid crystal device 100 which has the back light 40 having the microlens 30 that enables the high resolution image display with the high brightness, it is possible to provide the electronic equipment with the favorable display quality.

The embodiments described above have the following advantages.

I. The bank 29 which is the first convex portion is made as the bank 29 having the dent at its center because of so called coffee stain phenomenon. The microlens 30 can be formed only by the droplet discharge method with which the second droplet of the lens material is disposed on the bank 29 and cured. Accordingly, the manufacturing process becomes efficient since it does not require an exposure step or a developing step. In addition, there is no need of a mask used in the exposure step and an etching solution used in the developing step so that the manufacturing process becomes less costly. According to the embodiment of the invention, the first convex portion has the dent area at its center and the droplet tends to stay there. Furthermore, by utilizing the contact angle of the convex portion, it is possible to increase the amount of the droplet heaping up in the convex portion. Consequently, the microlens with a larger curvature compared with that of the microlens formed by disposing the droplet on a flat face can be obtained and it has the fine optical diffusibility.

II. According to the embodiment of the invention, the substrate P is made liquid-repellent, and the bank material in the form of the first droplet is repelled on the substrate P. This means that the size of the first droplet disposed on the substrate P tends to become smaller and the bank 29 can be formed smaller and denser. Furthermore, the microlens 30 can also be formed smaller and denser by disposing the lens material in the form of the second droplet on the bank because the bank 29 is liquid repellent.

III. According to the embodiment of the invention, the bank 29 which is the first convex portion is made liquid repellent so that it is possible to increase the curvature or the aspect ratio of the microlens 30 if the lens is formed by disposing the second droplet of the lens material on the bank 29 which is the first convex portion. In addition, the microlens 30 can be more easily manufactured because it is possible to control the amount of the second droplet of the lens material when it is disposed.

IV. According to the embodiment of the invention, it is possible to provide the optical films 31a, 31b with the fine light diffusibility at reduced cost since it has the microlens 30 manufactured at reduced cost.

V. According to the embodiment of the invention, it is possible to provide the screen 50 for the projection with the high resolution at reduced cost since it has the optical films 31a, 31b with the fine light diffusibility and manufactured at reduced cost.

VI. According to the embodiment of the invention, it is possible to provide the projector system 60 with the favorable contrast at reduced cost since it has the screen 50 for the projection with the high resolution and manufactured at reduced cost.

VII. According to the embodiment of the invention, it is possible to provide the diffusing plate 43 with the favorable light diffusibility at reduced cost.

VIII. According to the embodiment of the invention, it is possible to provide the back light 40 with the favorable contrast at reduced cost since it has the diffusing plate 43 with the high brightness and manufactured at reduced cost.

VIIII. According to the embodiment of the invention, it is possible to provide the liquid crystal device 100 with the fine contrast and the cellular phone 600 as the electronic equipment since it is equipped with the back light 40 with the favorable contrast and manufactured at reduced cost.

Although the embodiments of the invention have been described by way of example with reference to the accompanying drawings, it is to be understood that the embodiments described above do not in any way limit the scope of the invention but various changes and modifications will be applied within the scope and spirit of the present invention.

FIRST MODIFICATION EXAMPLE

Though the bank 29 which is the first convex portion is made of the different material from that of the microlens in the above described embodiment, the material is not limited to this. For example, the bank 29 may be formed of the same material as that of the microlens. In this case, the manufacturing process becomes simpler and it has the same refractive index as that of the microlens.

SECOND MODIFICATION EXAMPLE

Though the surface of the substrate P is made liquid repellent and the liquid-repellant layer H1 is formed onto in the above described embodiment, the surface treatment is not limited to the liquid repellent treatment. For example, the surface of the substrate P may be made liquid-attracting. In this case, it is possible to make the diameter of the bank 29 larger. Accordingly, the diameter of the microlens becomes larger.

THIRD MODIFICATION EXAMPLE

Though the microlens 30 is used in the screen for projection and in the projector system in the above described embodiment, the use of the microlens is not limited to this. For example, the microlens can be used as an optical component of a head for a leaser printer, a light acceptance face of a solid-state image pickup device (charge-coupled device), an optical coupling part of an optic fiber system, a light transmission device and the like.

What is claimed is:

1. A method of manufacturing a microlens having a convex shape on a substrate, comprising:
    providing a first droplet on the substrate;
    forming a first convex portion by drying the first droplet so as to solidify the first droplet;
    forming a concave area having a radius of curvature in the first convex portion by staining:
    providing a second droplet of a lens material in the concave area that is placed at a center of the first convex portion; and
    forming a second convex portion by curing the second droplet.

2. The method of manufacturing a microlens according to claim 1, further comprising: making the substrate liquid-repellent before the first droplet is provided.

3. The method of manufacturing a microlens according to claim 1, further comprising: making the first convex portion liquid-repellent before the second droplet is provided.

4. The method of manufacturing a microlens according to claim 1, wherein a peripheral part of the first convex portion is higher than an inner part of the first convex portion when the first convex portion is formed.

5. The method of manufacturing a microlens according to claim 1, wherein the first droplet is a liquid repellent material when the first convex portion is formed.

6. A microlens manufactured by the method according to claim 1, having a convex shape and formed on a substrate.

7. A microlens having a convex shape and formed on a substrate, comprising:
    a first convex portion formed by providing a first droplet on the substrate, and drying the first droplet so as to solidify the first droplet;
    a concave area having a radius of curvature provided at a center of the first convex portion; and
    a second convex portion formed by providing a second droplet in the concave area, and curing the second droplet.

8. An optical film, comprising:
    a substrate made of an optically transparent sheet or an optically transparent film; and
    the microlens according to claim 6 formed on the optically transparent sheet or the optically transparent film.

9. A screen for projection, comprising:
    a scattering film scattering a light toward an incident side or an exit side of the light, and/or a diffusion film diffusing the light, wherein the optical film according to claim 8 is used as at least one of the scattering film or the diffusion film.

10. A projector system, comprising:
    a projector; and
    the screen according to claim 9.

11. A diffusing plate, comprising:
    a scattering film scattering light, wherein the optical film according to claim 8 is used as the scattering film.

12. A back light comprising,
    a light guiding plate; and
    a diffusing plate provided in a light exit side with respect to a position of the light guiding plate, wherein the diffusing plate according to claim 11 is used as the diffusing plate.

13. An electrooptical device comprising the back light according to claim 12.

14. Electronic equipment comprising the electrooptical device according to claim 13.

* * * * *